(12) United States Patent
LaRue et al.

(10) Patent No.: US 6,298,762 B1
(45) Date of Patent: Oct. 9, 2001

(54) SAW BLADE WITH INSERTED MULTI-TOOTH ARCS

(76) Inventors: John D. LaRue, 6720 Golf Dr., Dallas, TX (US) 75205; Ron Turfitt, 5055 Rosewood Dr., Doylestown, PA (US) 18901

( * ) Notice: Subject to any disclaimer, the term of this patent is extended or adjusted under 35 U.S.C. 154(b) by 0 days.

(21) Appl. No.: 09/370,066

(22) Filed: Aug. 6, 1999

Related U.S. Application Data

(60) Provisional application No. 60/095,551, filed on Aug. 6, 1998.

(51) Int. Cl.[7] ............................. B23D 57/00; B23D 63/00
(52) U.S. Cl. ................................. 83/838; 76/112; 76/27; 83/835
(58) Field of Search ..................................... 76/25.1, 24.1, 76/101.1, 112, 27; 125/15; 83/835, 838, 840, 845, 854

(56) References Cited

U.S. PATENT DOCUMENTS

| | | | |
|---|---|---|---|
| 907,167 | 12/1908 | Neill | 76/112 |
| 1,130,649 | 3/1915 | Whitaker | 83/835 |
| 1,352,140 | 9/1920 | Napier | 76/112 |
| 1,535,096 | 4/1925 | Blum | 83/835 |
| 1,594,615 | 8/1926 | Harley et al. . | |
| 1,919,358 | 7/1933 | Bem | 76/112 |
| 2,318,549 | 5/1943 | Wilkie | 407/118 |
| 2,880,768 | 4/1959 | Kolesh | 83/661 |
| 3,633,637 | 1/1972 | Kolesh et al. | 83/840 |
| 4,727,778 | 3/1988 | Omi | 76/112 |
| 4,776,249 | 10/1988 | Barclay | 83/673 |
| 5,522,283 | 6/1996 | Brown | 76/27 |
| 5,524,518 | 6/1996 | Sundstrom . | |

*Primary Examiner*—W. Donald Bray
(74) *Attorney, Agent, or Firm*—Groover & Associates; Robert Groover; Betty Formby

(57) ABSTRACT

Solid carbide segments are brazed to the rim of a steel body and then teeth are ground into them. This allows more teeth/inch on the perimeter and larger diameter blades than on previous carbide-tipped blades. The segments, which typically form an arc of a circle, provide the improved performance of carbide blades without excessive expense of solid carbide blades.

12 Claims, 3 Drawing Sheets

SAW BLADE WITH INSERTED MULTI-TOOTH ARCS

CROSS-REFERENCE TO OTHER APPLICATION

This application claims priority from Ser. No. 60/095,551, filed Aug. 6, 1998, which is hereby incorporated by reference.

BACKGROUND AND SUMMARY OF THE INVENTION

The present invention relates to circular saws, having fine-pitch uniformly shaped non-metallic teeth, for cutting thin materials.

Background: Cutting Tool Hardness

Since the beginning of the Bronze Age, toolmakers have sought to improve the durability and functionality of tools by modifying their cutting edges. Early processes included work-hardening of bronze, and adding steel edges to iron implements. That process continues to this day as new, super-hard materials are developed and new applications are found for older ones. In general, the ideal cutting tool surface should combine abrasion-resistance (hardness) with shock-resistance (toughness). (Of course there are many other relevant properties, including yield strength, rigidity, temperature limits, corrosion resistance in some applications, etc.)

Solutions evolved as described in the Neibl U.S. Pat. No. 907,167(1909) and the Blum U.S. Pat. No. 1,535,096(1926), where a band of very hard steel was welded to another supporting band of softer steel and teeth were cut into the hard steel band. Whitaker, U.S. Pat. No. 1,130,649, (1916) and the Napier U.S. Pat. No. 1,352,140(1921), approach the same problem by applying special heat treatment and tempering to the cutting edge.

U.S. Pat. No. 1,919,358 to Bem suggested applying Stellite to the edge of a saw body, and then grinding teeth into that material. In the Bern patent, a hard facing material (in the form of a welding rod) was applied to the edge of a saw blade body by melting with an acetylene torch. Although Stellite is now an obsolete material, "hardfacing" materials are often applied by torch or spraying to the wear-edges of plows, bulldozer blades and rock drill stems. It is tempting to assume that these techniques could be used to build up a useful hard layer on a lathe tool or a saw blade, as proposed in the Bem patent. Unfortunately, such coatings suffer from high porosity, very low strength, and poor impact properties, rendering them unfit as cutting tools.

Following the development of tungsten carbide materials produced by powdered metal technology by Schroeter, U.S. Pat. No. 1,594,615 (1925), tungsten carbide moved steadily into tooling applications.

Background: Carbide-Toothed Circular Saws

Cutting tools (especially woodworking tools) often use inserted teeth of a material which is harder than the hardest of steels. The most common material used for this is a "cemented carbide," which typically includes small grains of tungsten carbide bonded into a matrix with a metal (typically cobalt). (Because the strength and hardness of the matrix are derived from the grains of tungsten carbide, such cemented carbides are often referred to simply as "carbide.") Such "carbide" saw tips have a hardness of about 92(Rockwell A). FIG. 3 shows a typical configuration of a section of a carbide tipped circular saw. Typically the main part of the saw blade 310 is a steel plate, and the carbide teeth 320 are brazed onto the leading edge of tooth profiles 330 which are cut out from the steel plate.

Some firms manufacture only the steel bodies of circular saws, which are hardened, tempered and finished in every way except for tipping, and are then sold to other saw manufactures who specialize in carbide tipping. Other firms manufacture the complete saws including both the steel bodies and the installed tips. In either case, the same standard carbide tips are used in the fabrication of the blades. The steel bodies are normally made of high-carbon alloy tool steel, then a pocket is ground into the periphery of the saw body to accommodate the carbide tips. The tips may be ¼ to ⅜ inches long, 0.062 to 0.093 inches thick and from 0.10 to 0.375 inches wide, depending on the width of the finished saw blade.

The normal industry practice is to affix the carbide tips to the steel bodies by means of brazing, typically with silver bearing brazing material. While satisfactory for most applications, the brazed joints limit the operating temperature and loads (particularly lateral loads) under which the blade can operate.

Additionally, the thickness of the carbide and the size of the brazed area provided by the seat pocket have a large bearing on the integrity of the joint. However, the same factors that favor a strong brazed joint also limit the number of carbide inserts that can be placed along the cutting edge of the saw. This, in turn, ultimately limits the minimum spacing between adjacent teeth, the number of teeth on the saw, and the number of teeth per inch of periphery. For example, carbide-tipped ten-inch blades are currently available with up to 100 teeth, but no more. This implies that the pitch of a conventional carbide-tipped saw cannot be less than one centimeter.

In the woodworking industry, carbide tipped saws are typically 8 to 20 inches in diameter. Depending on their function, the 8 inch blades may have between 24 and 48 teeth, and the larger saws 60 to 100 teeth. For cutting non-ferrous metals, the number of teeth is typically between 24 and 80 for saws ranging from 8 to 18 inches in diameter. However, saws with greater tooth density (i.e. more teeth per inch) would be required to produce superior finishes and to cut thin materials.

The geometry of brazed carbide circular saw construction limits tooth density to a maximum of about 10 teeth per inch of saw diameter, i.e., 100 teeth for a 10 inch saw. Some applications require a higher tooth density than carbide tipped saws can provide. In woodworking, these applications include the cutting of plywood and veneers where fine finish is required and splintering is unacceptable. Tooth density of at least twice that available from carbide tipped saws is required to cut thin metals, including thin wall tubing and extruded shapes. In addition, fine tooth saws leave less burr on cut surfaces.

More recently, the same technology has been applied to use polycrystalline diamond inserts which are dimensionally similar to and applied in the same manner (by brazing) as carbide. However, the same limitations on tooth pitch will still apply.

When faced with a problem requiring more saw teeth than carbide tipping can provide, the manufacturer has two choices. He can choose a steel saw and forego the benefit of the longer lifetime of carbide (which is about 4:1 over high speed steel), or he can select a solid carbide saw. The steel saws are relatively inexpensive but dull rapidly. Solid carbide saws have superior wear properties, but are brittle and are not available in sizes greater than 6 inches in diameter. Moreover, solid carbide saws are very expensive, typically 15 times that of a steel saw, as shown in FIG. 4, where the comparative costs of a steel blade versus a solid carbide blade are plotted at various diameters.

Background: Grit-Surfaced (Non-Toothed) "Saws"

A common type of cutting tool is a circular blade which does not have shaped teeth at its edge, but which is simply coated with a diamond grit. Such cutting tools are commonly referred to as diamond "saws," but in fact they do not perform the same type of material-removal action as is performed by a saw with shaped teeth. A saw with shaped teeth, when it is operating correctly, will carve off chips of material. By contrast, a grit-coated blade will have more of a scraping or abrasive action. (See generally Jim Effner, Chisels on a wheel (1992 ); and Peter Koch, Utilization of Hardwoods Growing on Southern Pine Sites (1985 ); both of which are hereby incorporated by reference.) A cutting action is greatly preferable for many applications, to produce a cleaner cut, lower temperature, and lower power requirements.

Background: Cutting Thin Materials

Sawing action is smoothest when there is always at least one tooth in the cut. For cutting very thin materials, this requires a very fine tooth pitch. If the tooth pitch cannot be made as small as the material thickness, it should still be made as small as possible.

For example, for cutting aluminum extrusions with ten-inch blades, blades with up to 300 teeth are often used; however, these are steel blades, and become dull relatively quickly. Similarly, artificial veneers of hard composites, and thin carbon-fiber composites, are extremely abrasive and are best cut by fine-tooth saws.

Background: Circular Saws with Tooth Segments

Large circular saws of the type used in sawmills (e.g. 20 to 60 inches in diameter) have long been designed with removable teeth. In a sawmill environment, this is very advantageous, because a damaged tooth can be replaced or resharpened quickly and easily without dismounting the entire blade. A variation of this, as described for example in U.S. Pat. No. 3,633,637 is to use removable multi-tooth segments for sawmill blades.

Background: Saw-Blade Tensioning

A circular saw appears to be simply a flat plate of metal with teeth, but this appearance is very deceiving. In use the saw blade will be rotating at a high speed (e.g. 3600 RPM for a 16" blade), and may be heated at its edge by the cutting operation (particularly if the saw has begun to get dull). These forces would tend to expand the circumference of a thin flat plate. Thus if the sawblade were simply a thin flat plate it might expand around its circumference, and might wobble. (Wobbling is very undesirable, since it makes the cutting action more imprecise, wastes material, slows cutting, and increases the wear on the saw blade, arbor, and bearings.) To avoid this, a substantial amount of tension is built into the blade's structure. Correct tensioning is particularly important with saw blades which are very thin. See U.S. Pat. No. 5,522,283, and the references cited therein, all of which are hereby incorporated by reference. The correct use of saw blade tensioning is critical, especially for large saw blades; and the elasticity of the steel used in the saw plate is part of the equation. That is, a material with a different elasticity would have a different relation between stress and expansion, and hence the balance between built-in stress and thermally-induced stress would be different. Another relevant characteristic of steel is that plastic deformation can be used to induce the desired built-in stress without fracturing or significantly weakening the material. Other materials (even very strong materials) would have different balances of these characteristics, and might not be as useful for saw blades.

Saw Blade With Segmented Multi-Tooth Super-Hard Close-Pitch Inserts

The present inventors have realized that there is no substitute for a superhard material in applications for cutting small aluminum extrusions, artificial veneers of hard composites, and similar materials. The present application discloses a saw blade (preferably a circular saw blade) with segmented multi-tooth close-pitch inserts of an extremely hard material, such as a cemented carbide. This permits super-hard materials to be used for extremely fine-pitch saw blades. To achieve this, segments of a superhard material are brazed to the rim of an alloy plate (preferably a steel plate) to form the complete circular saw blade. Preferably an intermediate layer, such as copper, is brazed between the superhard material and the plate.

An added advantage in assembling the rim from segments is that it is possible in an alternative method of assembly to first grind teeth into the segments and then coat the teeth with a vapor deposited diamond surface. The segments would then be brazed to the body of the saw, and the diamond surfaces on the teeth would be lapped to their final configuration.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation), in which:

Preferred Embodiment

The present application discloses a circular saw blade whose exterior rim is constructed of an extremely hard material (such as cemented carbide). While the effect of the construction is to produce a continuous rim of carbide around the periphery of a steel blade, it is not necessary that the rim be formed of a single piece of material. It is not only very difficult and expensive to produce a single ring of carbide material to be used for the rim of a saw, it is unnecessary.

For example, rather than attempting to produce a thin (0.10 inch) hoop-shaped piece with a 10 inch outside diameter and a 9.5 inch inside diameter, it is more practical to make 8 shorter pieces which can be joined end to end in final assembly. The length of the carbide pieces is selected so that the gullet between teeth will fall at the end joins of the carbide pieces. (The stress inherent in a very long brazed joint also suggests that in most cases, the rim should be formed by a number of parts rather than a single piece.)

Figure 1:
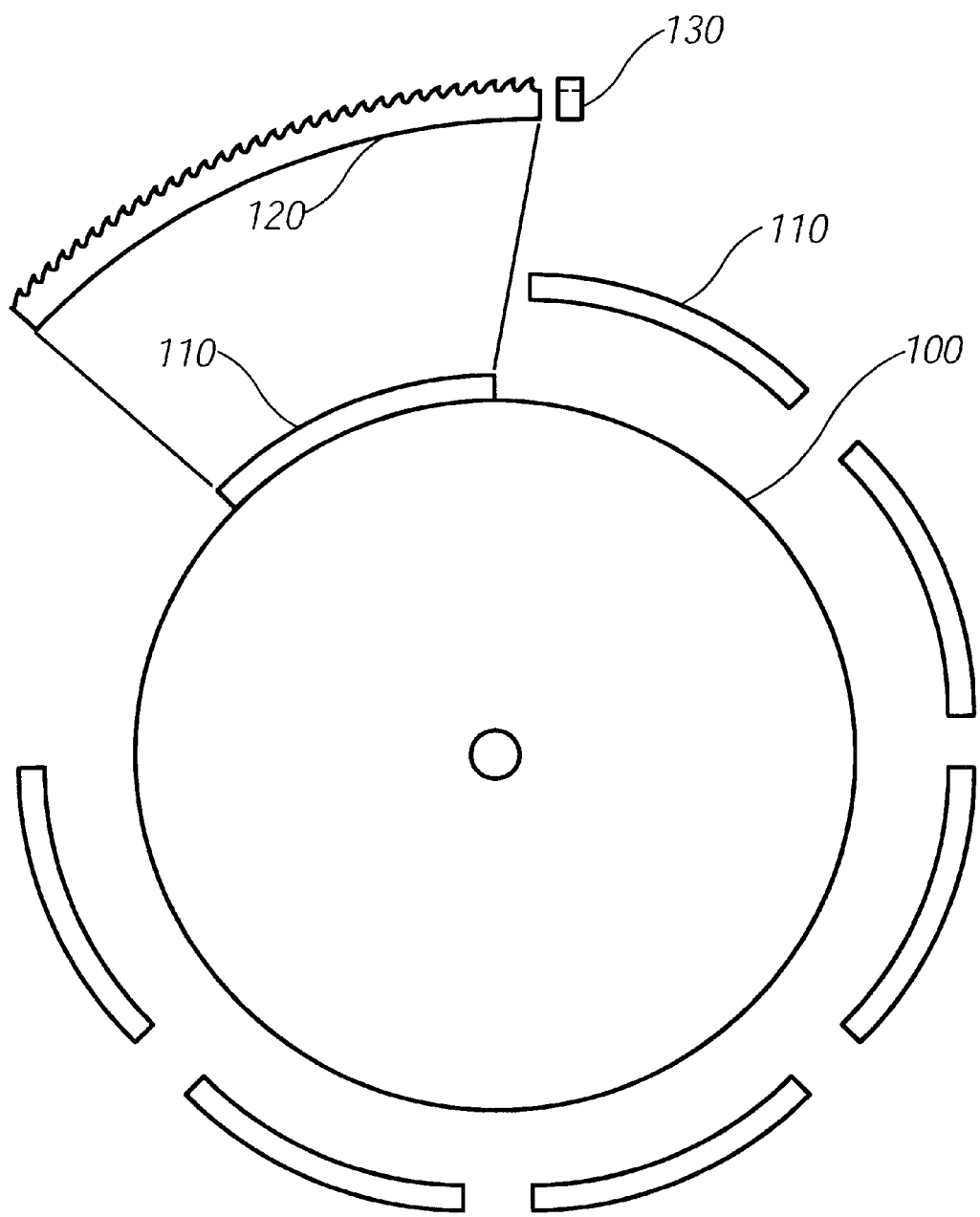
FIG. 1 shows a first embodiment of the disclosed saw blade segments.

FIG. 1 shows the presently preferred elements of the saw. Segments 110 of a hard material, which together form a circle, are attached to a saw body 100, composed of steel or other suitable material. A cross-section of blade segment 110 is seen at 130, and is generally rectangular, with the dotted line denoting the depth of the teeth cut into the segment. The method of attachment will preferably be welding or brazing. Once the hard material is fixed to the blade, teeth are ground directly into the rim by means of a "super-abrasive" diamond or cubic boron nitride grinding wheel. Segment 120 is an enlarged version of the segment below it, and demonstrates an arc into which teeth have been ground. This drawing represents a large metal cutting saw where the rim is most easily assembled in segments.

This technique, which is a radical departure from current fabrication practice, permits the number of teeth on a given saw to be increased by a factor of 2 to 4 times over that possible in saws equipped with carbide inserts. Carbide saws can be manufactured at relatively low cost, having the same tooth density as found only in high speed steel saws. In addition, this technique permits large diameter saws to be constructed which are functionally identical to solid carbide saws but having diameters not possible with solid carbide materials. Using this method, it is entirely practical to have a 10 inch diameter saw with a tough steel body and 300 sharp, extremely hard carbide teeth on its periphery.

The physical properties of the carbide require care and planning in producing this type of saw. The thermal expansion of steel is approximately 2.3 times that of carbide and Young's Modulus of elasticity for carbide is 3 times that of steel. This means that at brazing temperatures in the order of 1400° F., the steel will have expanded 2.3 times that of the carbide. On cooling, both materials will attempt to return to their room temperature dimensions, something that will be prevented by the fact that they are now locked together at the brazed joint. Because of its high Modulus, the carbide will compress very little and the rim of the steel body will be placed in tension. This can cause the residual stress at the braze to be very high, which can result in distortion of the steel body and/or the failure of the brazed joint.

The brazed joint must be designed very carefully to prevent failure at the join as a result of shearing stress between the brazed members. The principal strategy is to control the clearance in the joint. Silver-based braze material used in this application has a nominal shear strength of 25,000 psi. However, for reasons not completely understood (at least by this writer), it can have an effective strength of 135,000 psi if the joint clearance is quite small (0.001 to 0.002 inches). While this is a good thing in most types of fabrication, it must be avoided in this application.

Experiments have shown that the yield strength of fully annealed copper is only about 10,000 psi. There will be residual stress in the saw body after brazing, but some tension in a saw blade rim is necessary for dynamic stability. Tests have shown that the stress can be controlled within acceptable limits by one of two mechanisms, the selection of which will be determined by the size of the saw and the length of the each brazed joint.

In small saws, the carbide can be brazed to the steel body by providing a generous clearance between the parts and relying on the braze material filler to adsorb most of the join stress. This can be facilitated by an annealing strategy.

In larger saws, particularly those having thin bodies, the body is prepared by brazing a thin, flat copper wire around the edge. The carbide segments are then brazed to the copper rim using a controlled atmosphere, so as not to cause embattlement of the copper. During the cooling process, the copper band will deform, accommodating to a large extent the strain between the steel body and the carbide.

Alternate Embodiment —Variable Pitch

In an alternate embodiment, tooth configurations can be offered that have not previously been available on carbide saws. One example is the so called "variable pitch" configurations which have found considerable success on band saws. This is believed to provide better accommodation to chip clearance for thicker section while preserving the fine pitch needed for thin material.

Alternate Embodiment —Other Materials for Arcs

In a further alternate embodiment, the arcs can use an ultrahard material other than carbide, such as ceramics, cubic boron nitride, or polycrystalline diamond (PCD). Alternatively, PCD could be added as a coating over the carbide, after the teeth are formed.

Alternate Embodiment —Other Materials in Body

In a further alternate embodiment, the body of the saw blade can be formed of a material other than steel. For example, a composite of tungsten, carbide, and aluminum is contemplated.

Alternate Embodiment —U-Shaped Joint

Figure 2:
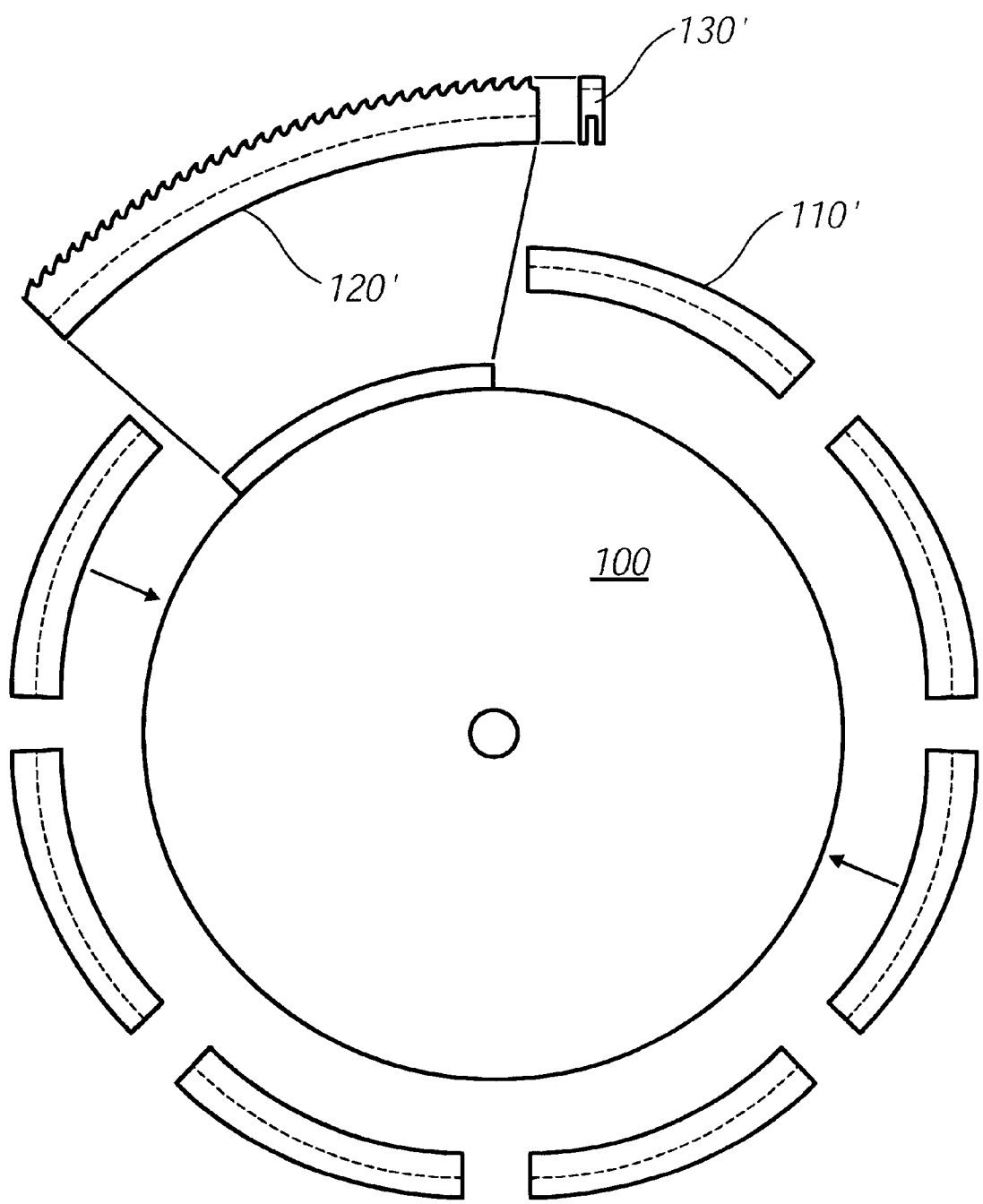
FIG. 2 shows a less preferred embodiment of the disclosed saw blade.
Figure 3:
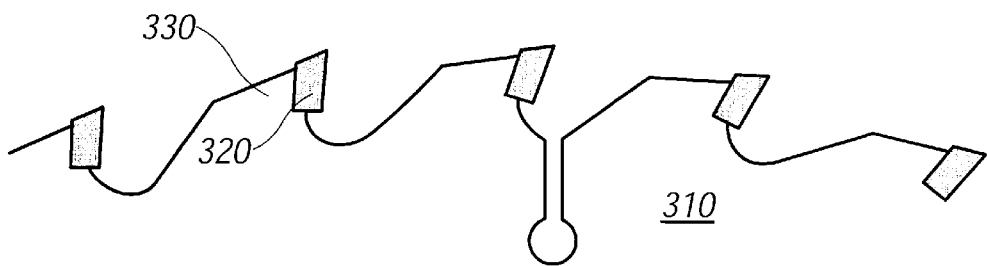
FIG. 3 shows an example of an existing sawblade in which only the cutting edge is carbide-tipped.
Figure 4:
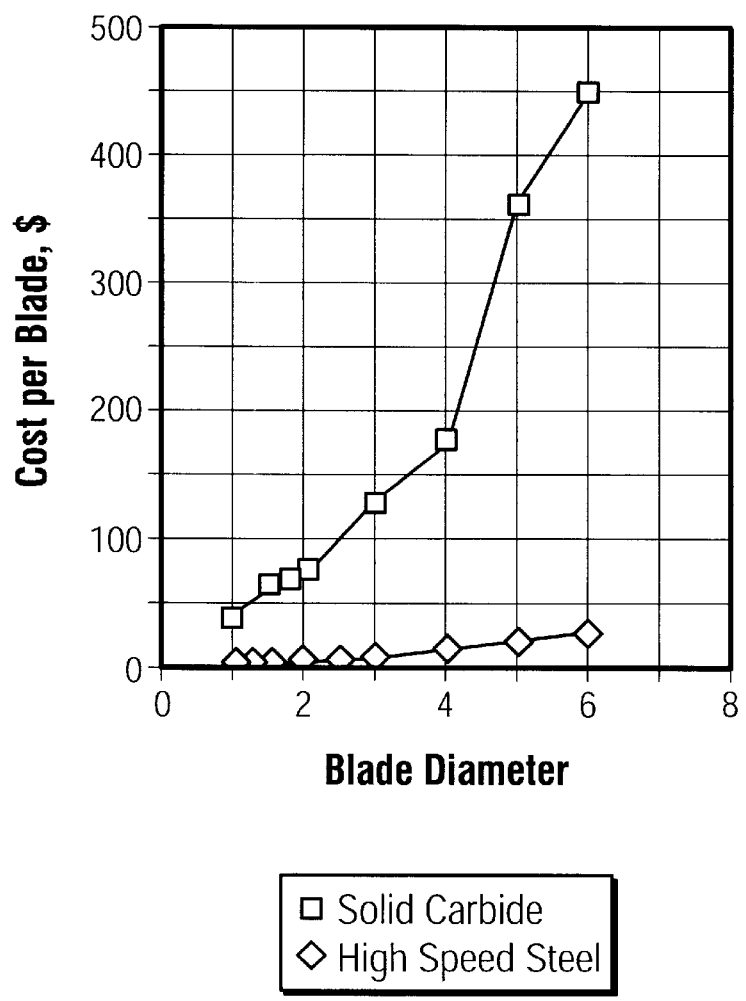
FIG. 4 shows a comparison between the cost of solid carbide saw blades versus high-speed steel blades at various diameters.

In a less preferred embodiment, shown in FIG. 2, the same body 100 is used as in the preferred embodiment, but the segments 110' and 120' have a cross-section 230 which includes a U-shaped opening 235 on the inner perimeter of the blade segments. Opening 235 fits over the steel base, providing a greater bonding area.

According to a disclosed class of innovative embodiments, there is provided: A circular saw blade, comprising: a plate, made of a metal; and one or more multi-tooth segments which are affixed to the perimeter of said plate; wherein each said segment includes multiple teeth, integrally formed with said segment, which protrude outwardly from said perimeter of said plate; and wherein each said segment is made of a super-hard material, which is harder than said metal, and which has a hardness greater than 90 on the Rockwell A scale.

According to another disclosed class of innovative embodiments, there is provided: A circular saw blade, comprising: a plate, made of steel; and one or more multi-tooth segments, made of a cemented carbide, which are affixed to the perimeter of said plate; wherein each said segment includes multiple teeth, integrally formed with said segment, which protrude outwardly from said perimeter of said plate.

According to another disclosed class of innovative embodiments, there is provided: A method of manufacturing saw blades, comprising: forming a circular metal base; attaching segments of a hard material to the outer perimeter of said circular metal base; grinding teeth into said segments.

According to another disclosed class of innovative embodiments, there is provided: A method of manufacturing saw blades, comprising: forming a circular steel base; attaching segments made of a cemented carbide to the outer perimeter of said circular steel base; grinding teeth into said segments.

Modifications And Variations

As will be recognized by those skilled in the art, the innovative concepts described in the present application can be modified and varied over a tremendous range of applications, and accordingly the scope of patented subject matter is not limited by any of the specific exemplary teachings given.

If better torch-applied or spray-applied coatings are developed in the future, then of course such coatings could optionally be used in combination with the methods and structures disclosed above. However, as of the effective filing date of this patent application, it does not appear to the present inventors that any such coatings can provide an adequate substitute for the methods and structures disclosed in this application.

In a further class of alternative embodiments, it is contemplated that the superhard multi-tooth segments can include more than one layer of different superhard materials.

In a further class of alternative embodiments, it is contemplated that a single plate design can be used to fabricate finished blades of different pitches, simply by assembling different segment pitches onto the plate.

In a further class of alternative embodiments, it is contemplated that various locking structures can be used to increase the brazing area which connects the carbide to the plate, and/or to locate the relative positions of the carbide and the plate.

What is claimed is:

1. A circular saw blade, comprising:

a plate, made of a metal; and one or more multi-tooth segments which are affixed to the perimeter of said plate;

wherein each said segment includes multiple teeth, integrally formed with said segment, which protrude outwardly from said perimeter of said plate;

and wherein each said segment is made of a super-hard material, which is harder than said metal, and which has a hardness greater than 90 on the Rockwell A scale.

2. The saw blade of claim 1, wherein said multi-tooth segments are made of a cemented carbide.

3. The saw blade of claim 1, wherein said multi-tooth segments are affixed to said plate by brazing.

4. The saw blade of claim 1, wherein said blade has a density of teeth greater than 10 teeth per inch of saw diameter.

5. The saw blade of claim 1, wherein said plate is made of a tungsten/carbide/aluminum composite.

6. A circular saw blade, comprising:

a plate, made of steel; and one or more multi-tooth segments, made of a cemented carbide, which are affixed to the perimeter of said plate;

wherein each said segment includes multiple teeth, integrally formed with said segment, which protrude outwardly from said perimeter of said plate.

7. The saw blade of claim 6, wherein said blade has a density of teeth greater than 10 teeth per inch of saw diameter.

8. A method of manufacturing saw blades, comprising:

forming a circular metal base;

attaching segments of a hard material to the outer perimeter of said circular metal base;

grinding teeth into said segments.

9. The method of claim 8, wherein said segments are formed of cemented carbide.

10. The method of claim 8, wherein said grinding step creates a density of teeth greater than 10 teeth per inch of saw diameter.

11. A method of manufacturing saw blades, comprising:

forming a circular steel base;

attaching segments made of a cemented carbide to the outer perimeter of said circular steel base;

grinding teeth into said segments.

12. The method of claim 11, wherein said grinding step creates a density of teeth greater than 10 teeth per inch of saw diameter.

* * * * *